CIRCUITS FOR MATCHING TRANSISTORIZED DIODES

Filed Sept. 30, 1958

INVENTOR
ARTHUR GILL
BY H. Vincent Harsha
ATTORNEY

United States Patent Office 3,040,193
Patented June 19, 1962

3,040,193

CIRCUITS FOR MATCHING TRANSISTORIZED DIODES

Arthur Gill, Berkeley, Calif., assignor to Raytheon Company, a corporation of Delaware Filed Sept. 30, 1958, Ser. No. 764,401
4 Claims. (Cl. 307—88.5)

This invention relates generally to semiconductive devices and circuits, and more particularly to a novel arrangement for matching the characteristics of a plurality of semiconductive devices.

The performance of many circuits, which contain more than one semiconductor diode, depends to a great extent upon proper matching of the characteristics of the diodes. This is especially true where the diodes are utilized as modulators or demodulators, since mismatch between the diodes sets a lower limit on sensitivity and linearity. Diodes having matched characteristics, i.e., so-called "matched diodes," are available in the industry, but the extreme care and control which must be exercised during the manufacture thereof in order to produce a pair of diodes having the same operational characteristics makes the price of these devices inordinately expensive. Consequently, alternative methods of achieving the same result utilizing ordinary semiconductive diodes have been proposed in the past. For example, semiconductive diodes have been matched by connecting a parallel resistor to one of the diodes and a series resistor to the other. Variation in the value of these resistors results in variations in the reverse or back resistance of one of the diodes in order to reduce its back resistance to a value approximately corresponding to that of the other diode, while the same variation results in an increase in the forward resistance of one of the diodes to bring it up to a value approximately corresponding to the forward resistance of the other diode. However, this result depends upon the fact that most diodes, which exhibit low forward resistance, also exhibit low reverse resistance. A scheme, such as has been described, involves the major disadvantages that the diodes often are not piecewise linear so that they can be matched only at two points on their characteristic curves, and that small adjustments in the reverse resistance of the diode require the use of a very large parallel resistor, which often is prohibitive because of noise in the system.

The present invention is concerned with a novel circuit arrangement, which may be utilized to match the forward and reverse resistance characteristics of a pair of "transistorized" diodes in such a way that the undesirable features of the prior art systems are to a major degree eliminated. The term "transistorized diode," as used in this specification, is intended to define a transistor which is so externally connected that it functions as a diode rather than as a transistor. Such a "transistorized diode" is described more fully in application Serial No. 764,402, filed September 30, 1958 by William H. Ryer and Paul A. Sullivan, and assigned to the same assignee as the present application.

In accordance with the principles of the present invention, a plurality of transistors, so connected as to operate as diodes rather than as transistors, may be utilized circuit-wise to perform the function of conventional diodes, and may have their characteristics matched over a wide range of operating values. The matching between the devices may be accomplished by inserting a resistance element directly between the collector and the base of a given "transistorized diode," and then varying the value of the resistance element to obtain the matching. Since the circuit is thus composed entirely of passive elements, and since even transistors which are rejected for use as transistors may be utilized as a "transistorized diode," the circuit of the present invention represents an effective and economical way of obtaining the necessary match between such devices in applications where a plurality of diodes must be used.

The invention will be better understood as the following description proceeds taken in conjunction with the accompanying drawing wherein.

Figure 1:
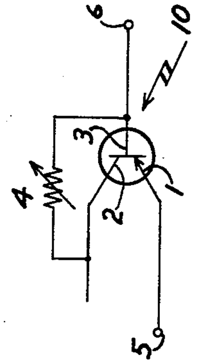
FIG. 1 is a schematic circuit diagram showing a transistorized diode having the two electrodes which comprise the output terminal connected together by a variable resistance element.

Referring now to the drawing and more particularly to FIG. 1 thereof, there is shown a transistorized diode comprising a transistor 10 having an emitter electrode 1, a collector electrode 2, and a base electrode 3. The collector electrode 2 is connected to the base electrode 3 through the resistance element 4. The emitter electrode 1 comprises a first terminal of the network and is connected to an input terminal 5, while the collector and base electrodes together form a second terminal of the network and are connected to an output terminal 6. As has been previously described in the aforementioned application of Ryer and Sullivan, it has been found that a short-circuit connection between the collector and the base or a connection between these two electrodes, which includes a source of bias voltage, results in a network which exhibits improved back and forward resistance characteristics over those of a conventional semiconductive diode. In accordance with the present invention, applicant has discovered that the provision of a resistance element connected between the two electrodes comprising the second terminal of the network produces certain novel and unobvious results, which enable such transistorized diodes to be utilized as matched diodes. To this end, it has been found that variation of the resistor 4 between approximately zero and approximately infinity increases the forward resistance of a transistorized diode by a factor of 2.6, and the reverse resistance by a factor of 1.5 on the average. Thus, there is provided a method of exercising control over these characteristics of a plurality of transistorized diodes by the connection of a variable resistor between the collector and the base of each of the devices.

Figure 2:
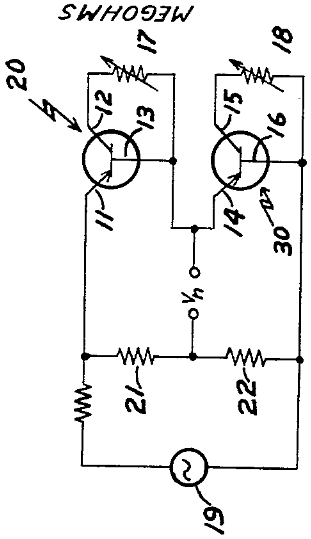
FIG. 2 is a schematic circuit diagram showing a pair of transistors connected as matched diodes.

In FIG. 2, there is shown a transistorized diode circuit useful in evaluating the matching conditions between the transistorized diodes, and including a pair of transistors 20 and 30 having emitter, collector, and base electrodes 11, 12 and 13 and 14, 15 and 16, respectively. The collector electrodes 12 and 15 are connected to the respective base electrodes 13 and 16 through the resistance elements 17 and 18, respectively. A source of signal current 19 is connected to the voltage divider comprising the resistances 21 and 22, which feed the signal voltage into the emitter electrodes 11 and 14 of each of the transistorized diodes 20 and 30. By way of example only, the values of the various elements shown in FIG. 1 may be as follows: resistors 21 and 22 have a value of 10 kilohms, the source voltage and impedance were chosen to yield a peak forward current of approximately 5 milliamps through the transistorized diodes, and a peak reverse voltage of approximately 12 volts across them. In the typical illustration shown above, the transistors 20 and 30 had the following characteristics:

$40 < r'_f < 110$ ohms
$1.6 < r'_r < 2.2$ megohms
$44 < r''_f < 120$ ohms
$1.8 < r''_r < 3.0$ megohms where $r'_f$ is the forward resistance of transistor 20;
$r'_r$ is the reverse resistance of transistor 20;
$r''_f$ is the forward resistance of transistor 30; and
$r''_r$ is the reverse resistance of transistor 30.

The matching by adjustment of $r'_r$ and $r''_f$ was accomplished by using a 50 kilohm potentiometer for resistor 17, and a 500 ohm potentiometer for resistor 18. With resistor 17=18=∞, $V_n$ was 1.1 volt peak-to-peak. With resistor 17=18=0, $V_n$ was 1.0 volt peak-to-peak. With resistor 17=10 kilohms and resistor 18=300 ohms, the minimum null voltage of 0.1 volt peak-to-peak for $V_n$ was obtained, thus improving the balance condition of transistorized diodes 20 and 30 by a factor of approximately ten. In other cases where the initial mis-match in characteristics is more pronounced, the improvement, which may be achieved by the matching scheme of the present invention, will, of course, be considerably greater.

Figures 3, 4:
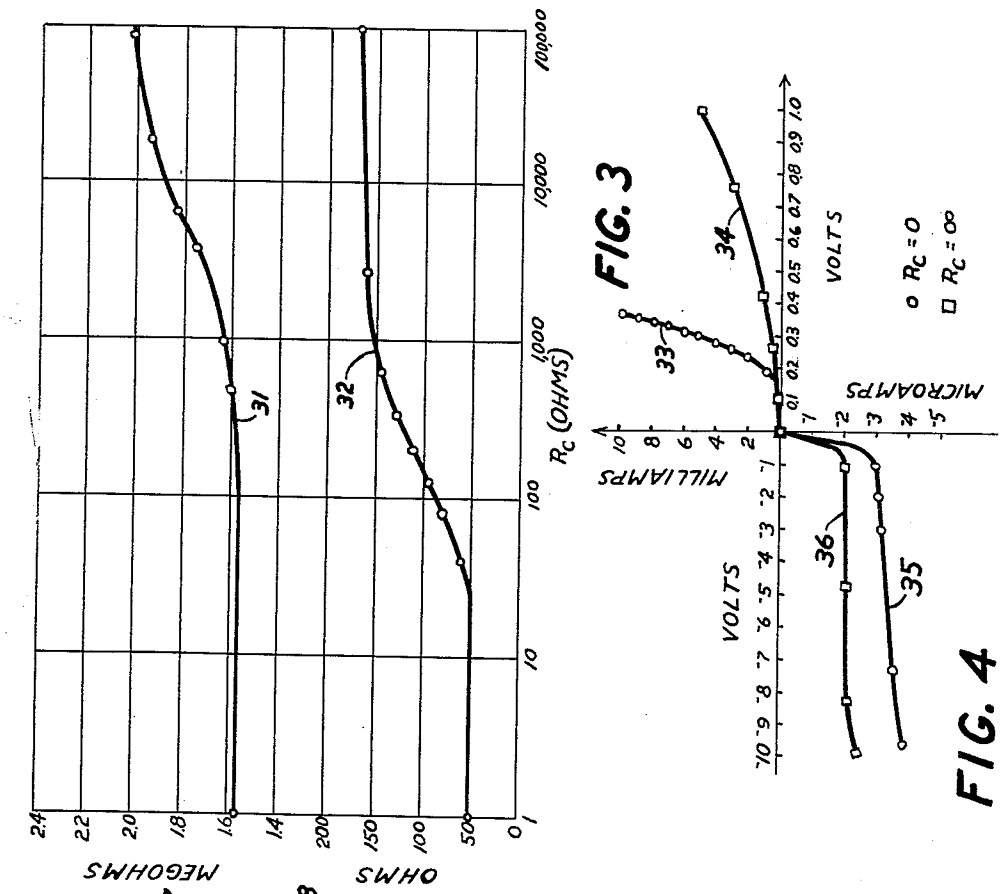
FIG. 3 is a graph showing the forward and reverse resistance characteristics of a transistorized diode as a function of the collector resistance.
FIG. 4 is a graph of the forward and reverse characteristics of a transistorized diode in which the inserted collector resistance is zero and in which the inserted collector resistance is infinity.

By utilization of the circuit of FIG. 2, it was further found that most of the change in the forward resistance occurs when the collector resistor is varied between 50 and 500 ohms, whereas most of the change in the reverse resistance occurs when the collector resistor is varied between approximately 1 kilohm and approximately 50 kilohms. Consequently, adjusting the forward resistance leaves the reverse resistance virtually unchanged, and vice versa. The effect of varying the collector resistor is to shift the entire diode characteristics up or down about the origin of the voltage-current field. This effect is clearly quite different than that of merely adding or subtracting a linear resistance. The curve 31 of FIG. 3 shows the variation in the reverse resistance of a typical transistorized diode as the value of its connected collector resistance is progressively increased. Curve 32 of FIG. 3 similarly shows the variation in forward resistance of a typical transistorized diode as the value of its connected collector resistance is increased. In FIG. 4, curves 33 and 34 show the forward resistance characteristics of the transistorized diode when the collector resistance is zero, and when it has an infinite value. Curves 35 and 36 similarly show the reverse resistance characteristics for these same conditions of collector resistance. By variation of the value of the collector resistance between these extreme values, the transistorized diodes may be matched over a wide operational range. Thus, transistorized diodes may be used in place of conventional diodes with superior results wherever matching is desired for proper circuit performance, as, for example, in a phase-sensitive rectifier circuit or the like.

In order to match the characteristics of a plurality of transistorized diodes, it is necessary that certain conditions be fulfilled. Let the forward resistance of a given transistorized diode vary between $r'_f$ (min) and $r'_f$ (max) and its reverse resistance between $r'_r$ (min) and $r'_r$ (max). Similarly, let the forward resistance of a second transistorized diode vary between $r''_f$ (min) and $r''_f$ (max), and its reverse resistance between $r''_r$ (min) and $r''_r$ (max), where the quantities $r'_f$, $r'_r$, $r''_f$ and $r''_r$ have the meaning previously ascribed to them. Under these conditions, matching of the two diodes by adjusting $r'_f$ and $r''_r$ may be accomplished only when the following conditions are simultaneously fulfilled: $r'_f$ (min) must be greater than or equal to $r''_f$ (max), which must be greater than or equal to $r'_f$ (max), and $r''_r$ (min) must be greater than or equal to $r'_r$ (min), which must be greater than or equal to $r''_r$ (max). Matching the diodes by adjusting $r''_f$ and $r'_r$ corresponds to a set of conditions which is identical with the one above except for interchanging the primed and double-primed quantities. An examination of these conditions reveals that they are equivalent to statements that the minimum forward or reverse resistance of one diode should be smaller than the maximum corresponding resistance of the other. Also, if the forward resistance of one diode is smaller than that of the other, the reverse resistance of this one diode should be also smaller than that of the other.

Although there have been described what are considered to be preferred embodiments of the present invention, various adaptations and modifications thereof may be made without departing from the spirit and scope of the invention as defined in the appended claims. For example, although the invention has been described with respect to so-called PNP transistors, NPN transistors could equally well be used. In addition, the resistance which is used to match the characteristics of the transistorized diodes could be connected between emitter and base electrodes, rather than between the collector electrode and base electrode.

What is claimed is:

1. The method of matching the forward and reverse resistance characteristics of a plurality of semiconductive devices, said method comprising interconnecting a first and a second transistor, introducing resistance into the collector-to-base circuit of each of said transistors, varying said resistance of said first transistor to substantially match the forward resistance characteristics of said first transistor to that of said second transistor, and varying said resistance of said second transistor to substantially match the reverse resistance characteristics of said second transistor to that of said first transistor.

2. In combination, a first and second transistor each having an emitter electrode, a collector electrode, and a base electrode, one of said electrodes of each transistor comprising an input terminal while the remaining two of said electrodes of each transistor are connected together to comprise an output terminal, means electrically interconnecting said transistors, variable resistance means connected between said two electrodes comprising the output terminal of said first transistor adapted to substantially match the forward resistance characteristics of said first transistor to that of said second transistor, and variable resistance means connected between said two electrodes comprising the output terminal of said second transistor adapted to substantially match the reverse resistance characteristics of said second transistor to that of said first transistor.

3. The method of matching the forward and reverse resistance characteristics of a plurality of semiconductive devices, said method comprising interconnecting a first and second transistor, introducing resistance between two of the electrodes of each of said transistors, varying said resistance of said first transistor to substantially match the forward resistance characteristic of said first transistor to that of said second transistor, and varying said resistance of said second transistor to substantially match the reverse resistance characteristic of said second transistor to that of said first transistor.

4. In combination, a first and second transistor, each having an emitter electrode, a collector electrode and a base electrode, one of said electrodes of each transistor comprising an input terminal while the remaining two of said electrodes of each transistor are connected together to comprise an output terminal, means electrically interconnecting said transistors, resistance means connected between said two electrodes comprising the output terminal of said first transistor adapted to substantially match the forward resistance characteristics of said first transistor to that of said second transistor and resistance means connected between said two electrodes comprising the output terminal of said second transistor adapted to substantially match the reverse resistance characteristics of said second transistor to that of said first transistor.

References Cited in the file of this patent

UNITED STATES PATENTS

| | | |
|---|---|---|
| 2,585,078 | Barney | Feb. 12, 1952 |
| 2,806,154 | Steinbuch | Sept. 10, 1957 |

FOREIGN PATENTS

| | | |
|---|---|---|
| 767,158 | Great Britain | Jan. 30, 1957 |
| 769,066 | Great Britain | Feb. 27, 1957 |